Figure 1:
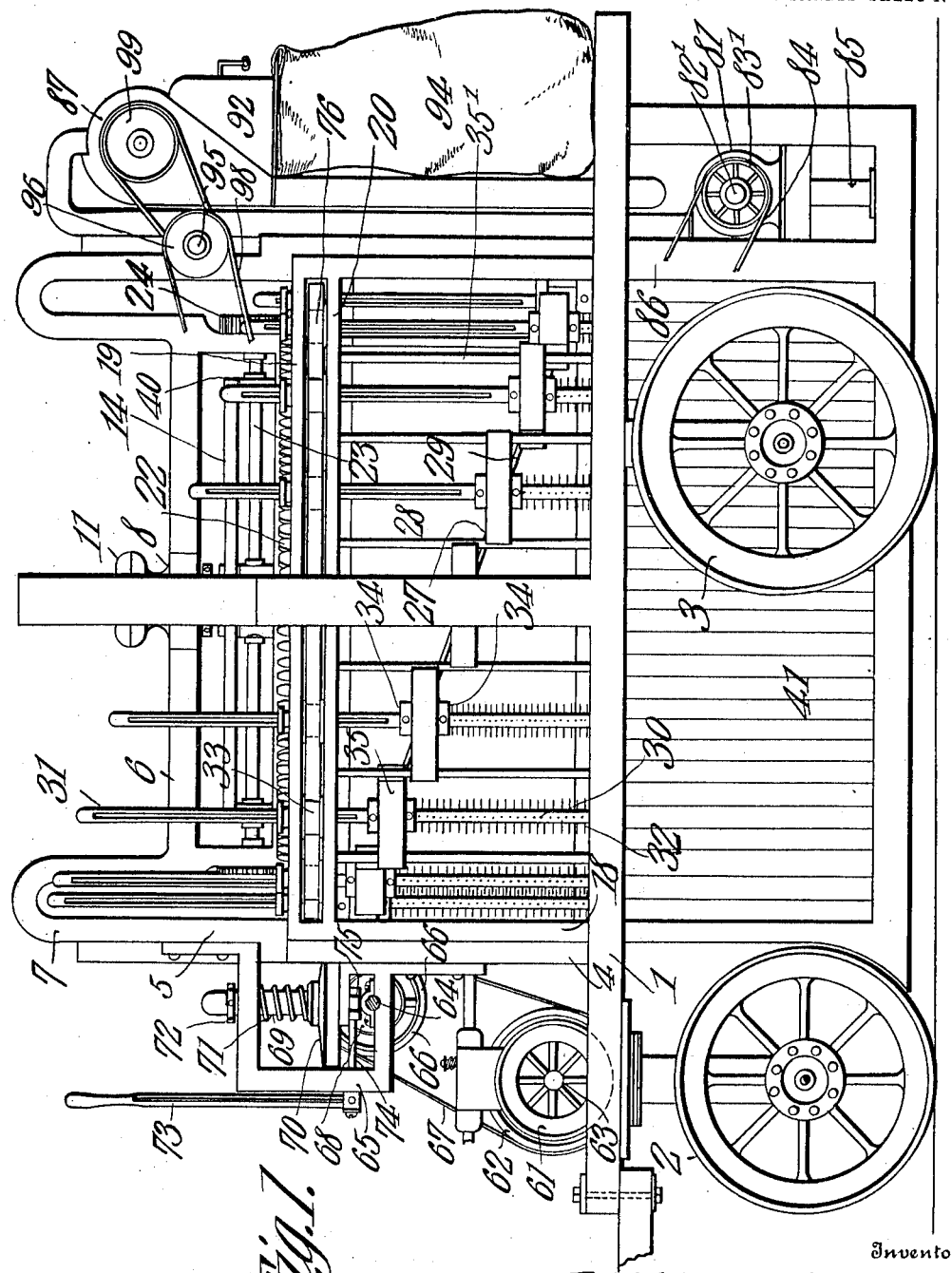

B. JOHNSON.
MACHINE FOR PICKING AND CLEANING COTTON.
APPLICATION FILED AUG. 18, 1908.

1,022,142.

Patented Apr. 2, 1912.
6 SHEETS—SHEET 2.

Witnesses

Inventor
Billie Johnson.
By C. A. Snow & Co.
Attorneys

B. JOHNSON.
MACHINE FOR PICKING AND CLEANING COTTON.
APPLICATION FILED AUG. 18, 1908.
1,022,142.
Patented Apr. 2, 1912.
6 SHEETS—SHEET 3.
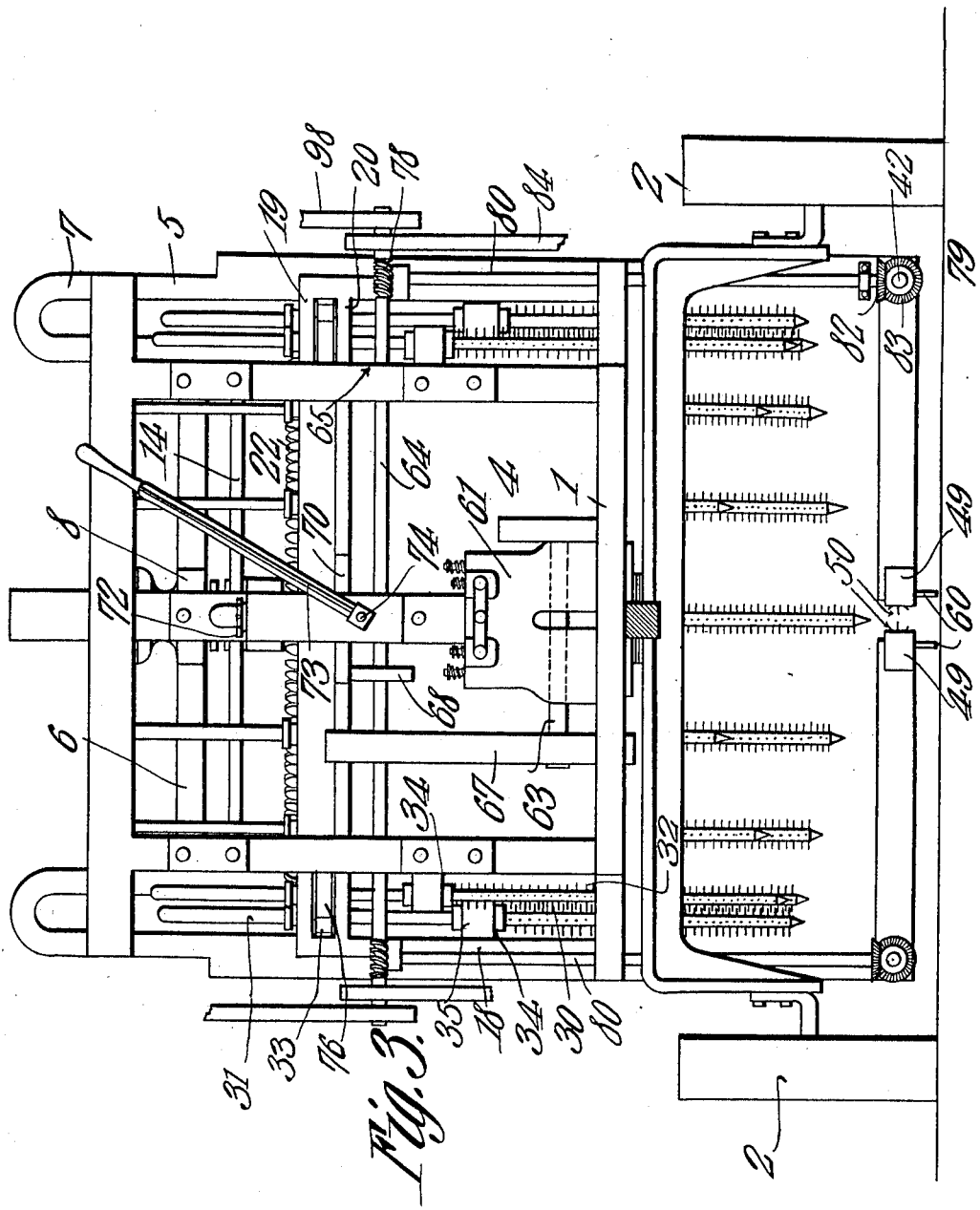
Inventor
Billie Johnson.
Witnesses
By C. A. Snow & Co.
Attorneys

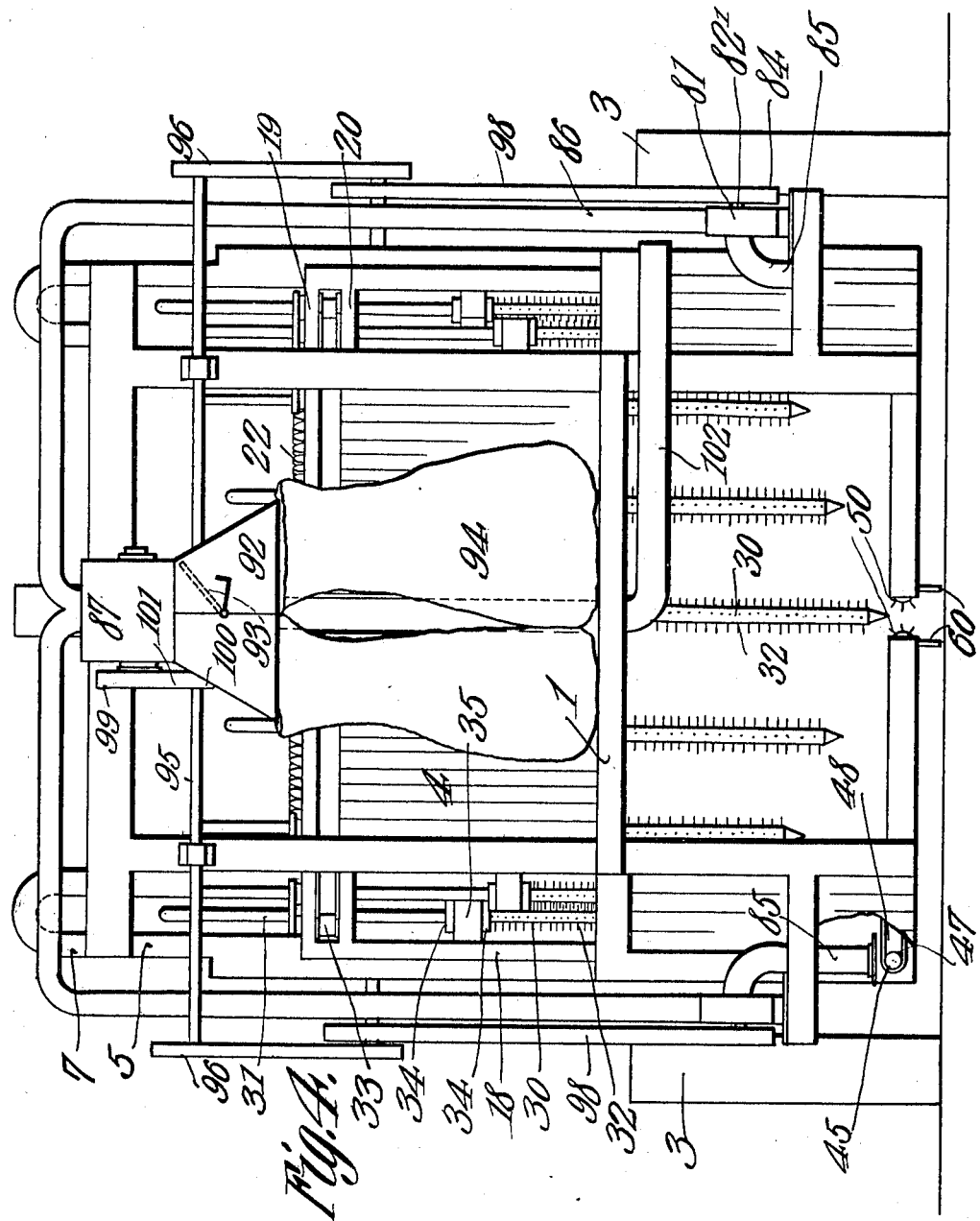

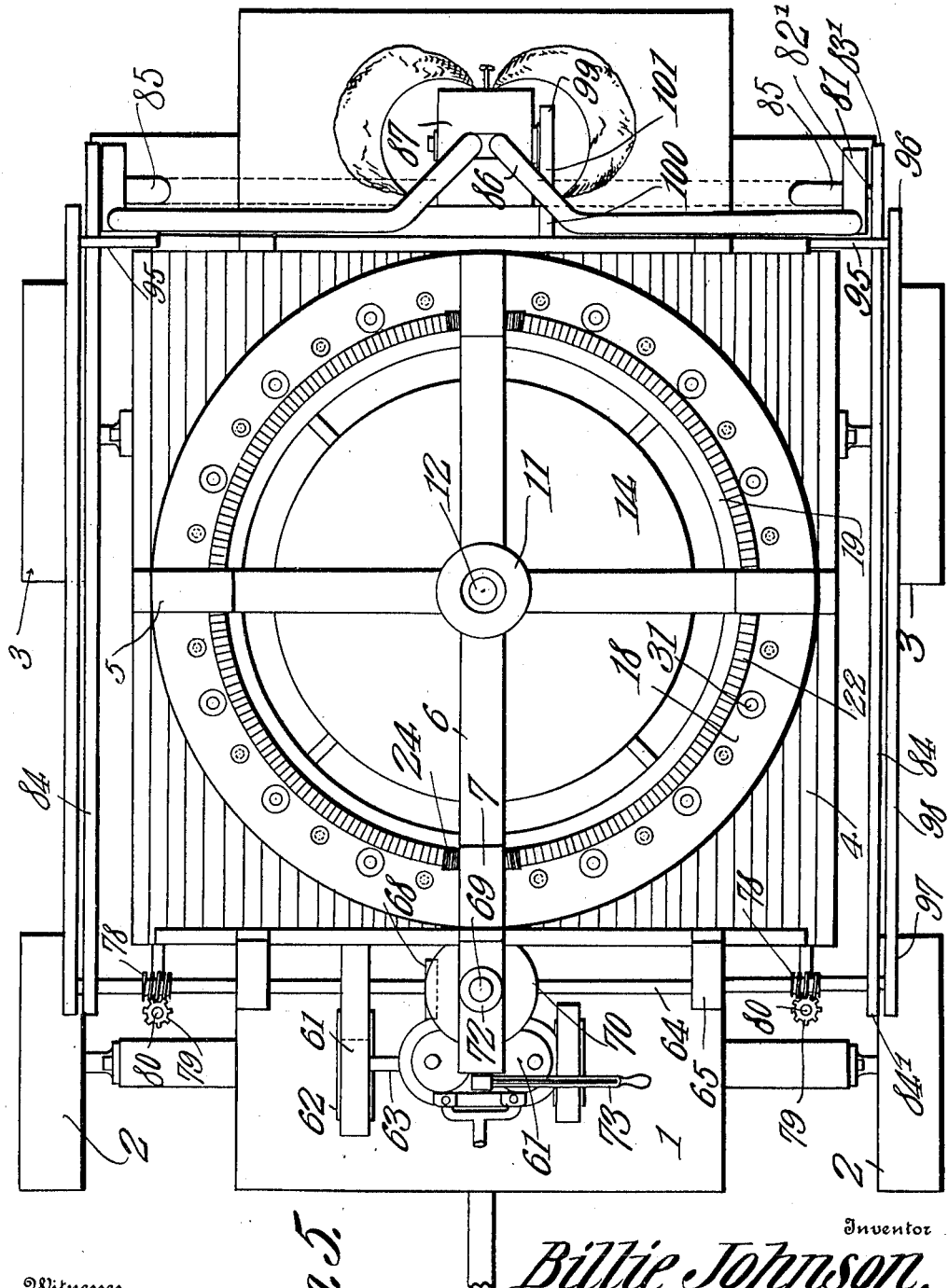

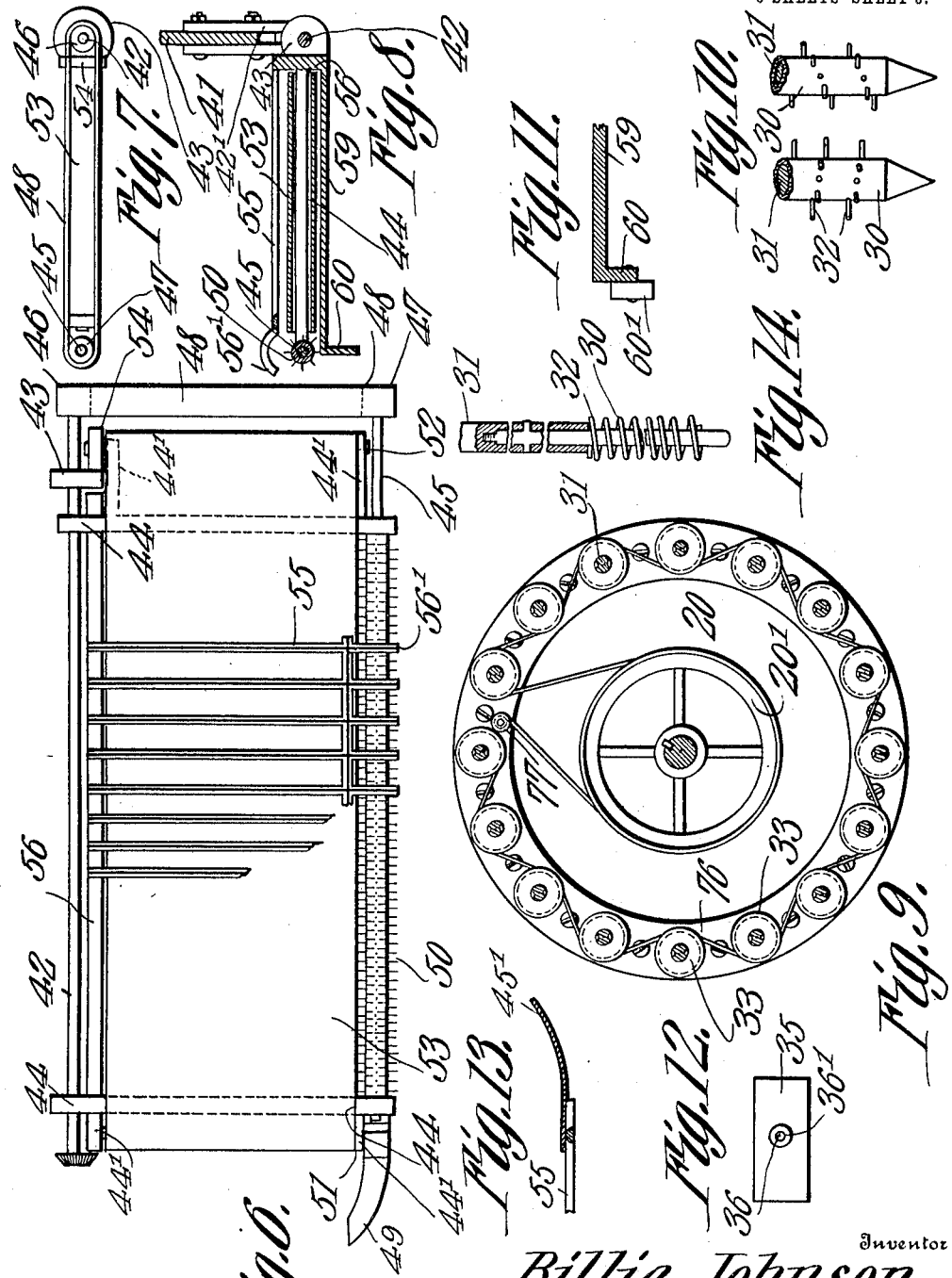

UNITED STATES PATENT OFFICE.

BILLIE JOHNSON, OF TEMPLE, TEXAS.

MACHINE FOR PICKING AND CLEANING COTTON.

1,022,142.  Specification of Letters Patent.  Patented Apr. 2, 1912.

Application filed August 18, 1908. Serial No. 449,113.

*To all whom it may concern:*

Be it known that I, BILLIE JOHNSON, a citizen of the United States, residing at Temple, in the county of Ball and State of Texas, have invented a new and useful Machine for Picking and Cleaning Cotton, of which the following is a specification.

This invention has relation to machines for picking and cleaning cotton and it consists in the novel construction and arrangement of its parts as hereinafter shown and described.

The object of the invention is to provide a machine of the character indicated which in turn is provided with a series of rotating pickers. Means is provided for reciprocating the said pickers longitudinally as they rotate and means is also provided for moving the pickers in an orbit during their reciprocation.

The machine is adapted to travel or move over the surface of the ground while in operation and consequently the pickers in addition to describing an orbit which is of sinusoidal configuration the said pickers at the same time progress or move with the machine. A rotating brush is carried by the machine and has engagement with the pickers and the said pickers move transversely in relation to the brush while the brush rotates in an opposite direction to that which the pickers move in describing their orbit. The means for causing the pickers to move longitudinally or reciprocate consists of a cylinder having at its periphery an annular groove spirally disposed. A block is carried by each picker and each block is provided with a laterally disposed lug which is located in the said groove of the disk. The said pickers are journaled for rotation in the said block but move longitudinally with the same consequently when the said disk rotates the blocks are raised and lowered and reciprocatory movement is transmitted to the pickers. An engine or other suitable means is provided for actuating the movable parts of the machine. A series of hinged sections is provided in the bottom of the machine and an endless belt conveyer is mounted upon each of the said hinged sections. Each section is provided with a runner or its equivalent which is adapted to have contact with the ground and consequently the said sections are swung upon their hinges as the said runner moves over the uneven surfaces of the ground. The endless belts or conveyers carried by the sections are located in advance of the transversely disposed belts or conveyers and a brush or its equivalent is carried by each hinged section and is journaled for rotation and is adapted to cast the cotton bolls or lint upon the said endless conveyer. A suction fan is located at the rear end of the machine and a pipe from the inlet of the fan casing terminates over the outer end of the said transversely disposed conveyers or belts and the cotton which is deposited upon the said transversely disposed belts is sucked up through the said inlet pipe into the casing and the staple is then forced through other pipes into a cleaner. From the cleaner the staple is lead through the discharge pipe into a chute provided for its reception and from the same the staple is permitted to fall into bags or other receptacles.

Figure 2:
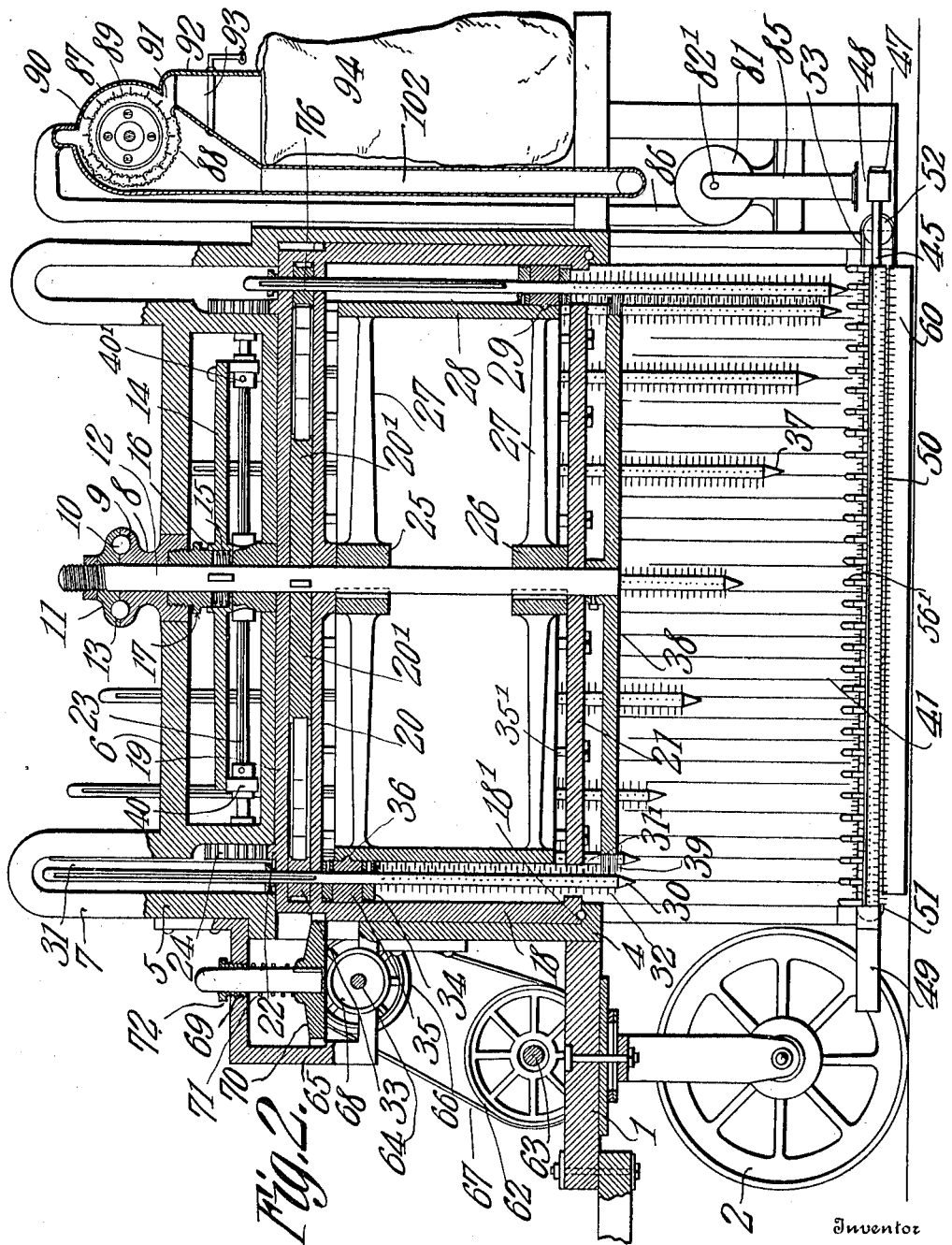

In the accompanying drawings;—Figure 1 is a side elevation of the machine. Fig. 2 is a longitudinal sectional view of the same. Fig. 3 is a front elevation of the machine.
Fig. 4 is a rear end elevation of the machine. Fig. 5 is a top plan view of the machine. Fig. 6 is a top plan view of one of the hinged sections of the bottom of the machine showing parts broken away. Fig. 7 is a rear end view of the lower portion of the bottom of the machine showing one of the transversely disposed endless belts in side elevation. Fig. 8 is a transverse sectional view of one of the hinged sections of the bottom of the machine. Fig. 9 is a plan view showing the means for transmitting rotary movement to the series of pickers. Fig. 10 is a detail view of the lower portions of the pickers showing the arrangement of the bristles thereon. Fig. 11 is a sectional view showing a runner provided with a roller. Fig. 12 is a side elevation of a block used in the machine. Fig. 13 is a sectional view of a modified detail of the machine. Fig. 14 is a modified form of the picker.

The machine consists of the platform 1 the forward end of which is mounted upon the dirigible wheel or wheels 2. The rear portion of the platform is supported by the ground wheels 3. The body or casing 4 is mounted upon the platform 1 and the said platform is provided with an opening for the reception of the said body or casing. The super-structure 5 is mounted upon the upper end of the said body or casing 4, and consists of the radially disposed arms 6 which are provided at their outer ends with the yokes 7 which in turn merge with or are located upon the upper end portions of the said body or casing 4. The bearing 8 is mounted upon the arms 6 and is provided with a ball race 9 which receives anti-friction bearing balls 10. The cap 11 is attached to the vertically disposed shaft 12 which is journaled for rotation in the bearing 8. The said cap is provided with the ball race 13 which also receives the said balls 10. The disk 14 surrounds the shaft 12 and is adapted to rotate with the same but may have limited longitudinal movement along the said shaft. The said disk 14 is provided at its middle with a cavity 15 which receives the coil spring 16. The sleeve 17 is screw-threaded in a recess provided in the under side of the arms 6 at the point where the shaft 12 passes through the same and the lower end of the sleeve 17 presses upon the upper end of the spring 15. It is obvious that by turning the sleeve 17 that the tension of the spring 15 may be increased or diminished. The frame 18 is provided at its upper end with the parallel spaced disks 19 and 20 and at its lower end with the disk 21. The said disks 19, 20 and 21 are loosely journaled upon the shaft 12. The disk 19 is provided upon its upper surface with a concentric set of gear teeth 22. The horizontally disposed shafts 23 are journaled for rotation in the superstructure 5 of the machine and the said shafts are provided at their outer ends with the pinions 24 which are in mesh with the gear teeth 22 upon the upper disk 19 of the said frame 18. Means is provided for rotating the frame 18 as will be hereinafter explained. The hubs 25 and 26 are fixed upon the shaft 12 and are provided with spokes 27 which connect with the cylindrical rim 28. The said cylinder is provided at its periphery with an annular inclined groove 29. The machine is provided with a series of pickers 30. Each picker consists of a shaft 31 the upper end portion of which passes through registering perforations in the disks 19 and 20 and the lower end portion of which passes through the perforation 31' provided in the disk 21. The lower end portion of each picker 30 is provided with bristles or brushes 32 and the upper end portion of each shaft 31 is slidably mounted between the disks 19 and 20 and is held against lateral movement by the said disks. The said shafts 31 are feathered in the pulleys 33 and consequently they rotate with the said pulleys but may move longitudinally through the same as above stated. The collars 34 are fixed to the shafts 31 of the said pickers and a block 35 is located between each pair of collars 34 and is loosely journaled upon the shaft of the picker 30. Each block is provided with a laterally disposed lug 36 and the said lugs of all the blocks enter the annluar groove 29 of the cylinder 28. The lower end of the shafts 31 are pointed as at 37. The brush 38 is fixed to the lower end of the shaft 12 and is located below the disk 21 of the frame 18. The said brush is provided at its periphery with the bristles 39 which have contact with the bristles 32 of the picker 30. The friction pulleys 40 are mounted upon the shafts 23 and are located over the upper side of the super-structure 5. The peripheral portion of the disk 14 rests upon the upper sides of the said friction pulleys 40 and the said disk 14 is held in frictional contact with the said pulleys 40 under the tension of the spring 15.

The sides 41 depend from the platform 1. A shaft 42 is journaled for rotation at the lower end of side 41 in suitable brackets 42' and each shaft 42 is provided with a friction disk 43. The arms 44 are pivotally mounted upon the shaft 42 and the shaft 45 is journaled for rotation at the inner ends of the arms 44. A belt pulley 46 is mounted upon the shaft 42 and the belt pulley 47 is mounted upon the shaft 45. The endless belt 48 passes around the pulleys 46 and 47. The guide 49 is located at the forward end of the shaft 45. The brush 50 is mounted upon the shaft 45. The shafts of the rolls 51 and 52 are journaled in the laterally extending lugs 44', carried by the arms 44. The endless belt 53 passes around the rolls 51 and 52. The friction wheel 54 is mounted upon the shaft of the roll 52 and has frictional contact with the disk 43 mounted upon the shaft 42. The grating 55 is located over the endless belt 53 and is provided with the curved end portions 56' which are located over the brush 50. The said grating 55 is supported by the beam 56 which in turn is supported by the arms 44. The flooring 59 is attached at one edge to the beam 56 and is provided at its opposite longitudinal edge with a depending runner 60. The said runner 60 is adapted to pass along the surface of the soil and serves as a guide to hold the endless belt 53 and the conveyer belt 48 at a uniform height above the surface of the ground.

The engine 61 is mounted upon the forward end portion of the platform 1 and the belt pulley 62 is mounted upon the shaft 63 of the said engine. The shaft 64 is journaled for rotation in the brackets 65 which in turn are mounted upon the forward portion of the body 4 and the belt pulley 66 is mounted upon the said shaft 64. The belt 67 passes around the pulleys 62 and 66 and is adapted to transmit rotary movement from the engine shaft 63 to the shaft 64. The friction disk 68 is mounted upon the shaft 64 and the vertical shaft 69 is journaled for rotation in the said bracket 65. The disk 70 is mounted upon the shaft 69 and normally bears against the upper portion of the periphery of the friction disk 68. The said disk 70 is held in frictional contact with the disk 68 by means of the coil springs 71 which bears at its lower end against the upper side of the said disk 70 and at its upper end against the under portion of the upper sides of the bracket 65. The tension of the said spring 71 is governed by the nut 72 which is screw threaded in a perforation in the upper portion of the bracket 65 and which bears against the upper end of the said spring 71. The lever 73 is fulcrumed upon the bracket 65 and is connected at its lower end portion with the shaft 74. The eccentric 75 is mounted upon the shaft and is adapted to have contact with the under side of the disk 70 when the lever 73 is swung the said eccentric 75 is adapted to lift the disk out of contact with the periphery of the disk 68. The periphery of the disk 70 engages the upper portion of the frame 18 frictionally, or by cog-gear, as desired and it is obvious that as the said disk 70 rotates, rotary movement is transmitted from the same to the said frame 18. The disk 20' is loosely mounted upon the shaft 12 and the pulleys 33 are slidably mounted upon the shafts 31 of the pickers. By reference to Fig. 9 of the drawing it will be seen that an endless belt 76 passes around the disk 20' and also has contact with the sides of the pulleys 33. The tension device 77 is mounted upon the disk 20 and engages the endless belt 76 and is adapted to keep the same taut. The belt has contact with the opposite sides of the adjacent pulleys 33 so that the said pulleys rotate in opposite directions with relation to the pulleys next adjacent. Therefore it will be seen that the shafts 31 alternately rotate in opposite directions and the pickers 30 rotate accordingly.

The worm gears 78 are mounted upon the end portions of the shaft 64 and mesh with the pinions 79 mounted upon the vertically disposed shafts 80. The beveled pinions 82 are carried by the lower ends of the shafts 80 and mesh with the beveled pinions 83 located upon the shafts 42. The fans or blowers 81 are located at the rear end portion of the frame 1 and the shaft 82' of each said fan or blower is provided with a pulley 83'. The endless belt 84 passes around the pulleys 83' and the pulley 84' located upon the shaft 64. The upper end of the pipe 85 connects with the inlet end of the casing of the fan 81 and the lower end of the said pipe 85 is disposed above the outer end portion of the endless conveyer 48. The lower end of the discharge pipe 86 connects with the fan casing 81 and at its upper end the said pipe 86 connects with the cylinder 87. The concaved screen 88 is mounted in the interior of the cylinder 87 and the foraminous drum 89 is journaled for rotation in the said cylinder 87. The said drum is provided upon its periphery with a series of radially disposed pins 90. The cylinder 87 is provided with an outlet opening 91 which communicates with the chutes 92. The chutes 92 are in duplicate with their upper ends verging into or connecting directly with the discharge outlet 91 of the cylinder 87. The valve 93 is mounted within the chutes 92 and may be disposed or swung to one side or the other for the purpose of directing the material which is delivered from the cylinder 87 into either one or the other of the chutes 92 as desired. The bags or receptacles 94 are adapted to be located upon the rear end portion of the platform 1 and are connected at their upper ends with the lower ends of the chutes 92 and may receive cotton from either one of the said chutes.

The shaft 95 is journaled for rotation at the upper rear end portion of the frame 5 and the belt pulleys 96 are mounted upon the end portions of the said shaft 95. The pulleys 97 are mounted upon the shaft 64 and the endless belts 98 pass around the pulleys 96 and 97. The pulley 99 is mounted upon the shaft of the drum 89 and the pulley 100 is mounted upon the shaft 95. The endless belt 101 passes around the pulleys 99 and 100 and is adapted to transmit rotary movement from the shaft 95 to the drum 89.

The operation of the machine is as follows. As the machine is moved along the surface of the ground and longitudinally along a row of standing plants the guides 49 direct the lower portions of the stalks of the plants between the brushes 50 or their equivalents at the same time the frame 18 is rotated as above described while the shaft 12 is rotated in the opposite direction. As the said frame 18 rotates it carries around with it the pickers 30 in an orbit and as the cylinder 28 carrying the groove 29 is turning in the opposite direction and the said groove 29 is inclined and in contact with the lugs 36 of the blocks 35 the pickers 30 are moved in a sinusoidal orbit, that is to say they are reciprocated longitudinally with relation to the brush 38 while they move in the path of a circle. As the said pickers 30 reciprocate longitudinally they come in contact with the cotton borne upon the branches of the plants and force the same down upon the endless conveyers 53. The brush 38 removes the lint from the bristles 32 should any cling thereto and the said lint thus removed from the said bristles 32 falls upon the endless belt conveyers 53. The grate 55 prevents sticks and other trash from falling upon the said endless conveyers 53. As the said conveyers 53 are in motion as above described the staple is carried back toward the transversely disposed conveyers 48 and is deposited upon them. As the said conveyers 48 are moving at their upper sides toward the lower ends of the pipes 85 the staple is carried under the ends of the said pipes and is drawn up through the pipes in response to suction created by the fans 81. From the fans 81 the staple is forced up through the discharge pipe 86 into the cylinder 87. When the material enters the cylinder 87 it is caught up by the pins 90 and carried around the concave 88 and the sand and grit are separated from the cotton and passed through the said concave. The grit and other matter thus separated passes down through the pipes 102 from whence it is discharged. The cotton that adheres to the pins 90 is carried around until it reaches the outlet 91 of the cylinder 87 and it then passes through the said outlet into the chutes 92. From this point the cotton falls upon the valve 93 and is deflected into a bag or other receptacle 94. It will be observed that the blasts of air which are created by the suction fans 81 operate on the material while it is in the cylinder 87 and the air may have a comparatively unobstructed passage through the drum 89 while the cotton and other materials are carried around with the same. Consequently as the air emerges from the interior of the drum 89 in an effort to make its escape through the outlet 91 it will force the material from the pins 90 and from the periphery of the drum 89.

The machine as hereinbefore described, includes the principal parts of the invention and the general arrangements thereof. Variations may be made in such arrangements as will be hereinafter explained and which are illustrated in several of the views of the drawings. For instance, as illustrated in Fig. 10 of the drawings, the lower portions 30 of the pickers may be separated or detached from the picker shafts 31, consequently, when the bristles upon the said portions 30 become worn the said portion may be removed and a portion having new bristles may be substituted in its stead. As illustrated in the said figure, the bristles 32 are spirally mounted upon the pickers and may be of steel, hair, bristle, or other suitable material, but preferably of ordinary bristle. As above described, the bristles on the adjacent pickers move toward each other and as they are spirally disposed as shown, with the spirals upon one member of the pair of bristles oppositely disposed to the spiral upon the other member, this disposition of the bristles facilitates the removal of the cotton from the plants. When the cotton is engaged by the said bristles it is driven down toward the belt conveyers 53 and is at the same time given a twist by the said bristles, which has a tendency to tear the cotton from the boll and also to deposit the same upon the said belt conveyers.

Should any of the cotton lint adhere to the bristles of the pickers it will be operated upon as the said picker ascends by the brush 38. The said brush 38 may have bristles 39 as illustrated in Fig. 2 of the drawings, or it may be provided in lieu of the said bristles with fan-shaped blades which will have a tendency to blow the lint from the bristles of the pickers and cast the same down upon the endless conveyer belt 53.

As illustrated in Fig. 12 of the drawings the blocks 35 may be provided with the friction rollers 36' mounted upon the lugs 36. The said rollers 36' will travel in the spiral groove 29 provided in the periphery of the cylinder 28 and will reduce the friction between the said blocks and the said cylinder. It will also be seen by reference to Fig. 2 of the drawing that the frame 18 is mounted upon the anti-friction bearing balls 18' and the said balls sustain the weight of the frame 18 and reduce the friction thereof.

As illustrated in Fig. 11 of the drawings, the runners 60 may be provided with ground-wheels 60' which are adapted to travel over the surface of the ground and perform the same functions as those described hereinbefore for the runners 60. The blocks 35 are recessed at their ends and receive the vertically disposed rods 35' which in turn are attached at their ends to the disks 20 and 21 and which form guides for the said blocks 35.

In Fig. 13 of the drawings a modification is illustrated which consists of a flexible valve or fender 45' which is attached to the edge of the grating 55, and which may be used in the place of the rotating brushes 50, shown in Fig. 8 of the drawings. Each of the gratings 55 is provided with such a valve or fender 45' and they are adapted to substantially come together at their inner edges in inclined positions as illustrated in the said Fig. 13. The lower portions of the stalks of the plants may pass between the inner edges of the said fenders 45' as the material of which they are composed is of sufficient resiliency to move away from the stalks of the plant. When, however, the said fenders 45' pass beyond the stalks of the plant they will come together or substantially so and close the passageway previously made for the stalks. Thus any cotton lint or bolls which should happen to fall upon the said fenders 45' will be conducted to the endless belt conveyers 53.

By reference to Fig. 2 of the drawing it will be seen that the friction pulleys 40 are arranged upon the shaft 23 and may slide longitudinally thereof and be secured in adjusted positions by means of set screws 40' which pass through the hubs of the said pulley wheels 40. Thus the said wheels 40 may be shifted with relation to the disk 14 whereby the rate of speed at which the said disk will rotate may be regulated. Thus the shaft 12 and its attachments may be caused to rotate at a rapid or slow speed, and thus provision is made for varying the speed at which the pickers will operate, the advantage gained being that all cotton would not probably require the same speed on the part of the pickers and the brush to remove the pods or bolls from the plants.

Having described my invention what I claim as new and desire to secure by Letters Patent, is:—

1. In a cotton harvester a rotating and revolving picker and a rotating cylinder having means for reciprocating the picker parallel with the axis of the cylinder.

2. In a cotton harvester a picker revolving about an axis and rotating axially, and a rotating cylinder having means for reciprocating the picker parallel with the axis of the cylinder.

3. In a cotton harvester a rotating and revolving picker and a rotating spirally grooved cylinder for reciprocating the picker.

4. In a cotton harvester a picker moving in a sinusoidal orbit, and a rotating spirally grooved cylinder for communicating to the picker the reciprocating component of such movement.

5. In a cotton harvester a rotating picker moving in a sinusoidal orbit, and a rotating cylinder having means for communicating to the picker the reciprocating component of such movement, which movement is parallel with the axis of the cylinder.

6. In a cotton harvester a rotating and revolving picker moving in a sinusoidal orbit and a rotating cylinder having means for communicating to the picker the reciprocating component of such movement.

7. In a cotton harvester a picker moving in a sinusoidal orbit and a rotating brush coöperating with the picker.

8. In a cotton harvester a rotating picker moving in a sinusoidal orbit, and a rotating brush coöperating with the picker.

9. In a cotton harvester a picker moving in a sinusoidal orbit and a coöperating brush moving in the direction opposite to the orbital movement of the picker.

10. In a cotton harvester a rotating picker moving in a sinusoidal orbit and a coöperating brush moving in the direction opposite to the orbital movement of the picker.

11. In a cotton harvester a rotating and revolving picker moving in a sinusoidal orbit and a coöperating brush moving in a direction opposite to the orbital movement of the picker.

12. In a cotton harvester a picker rotating upon its own axis and moving about an axis, a rotating brush coöperating with the picker and a rotating cylinder having means for reciprocating the picker parallel with the axis of the brush.

13. In a cotton harvester a picker revolving about an axis and rotating axially, a rotating brush coöperating with the picker, and a rotating cylinder having means for reciprocating the picker parallel with the axis of the brush.

14. In a cotton harvester a picker revolving about an axis and rotating axially, a rotating brush coöperating with the picker and a rotating cylinder having means for reciprocating the picker parallel with the axis of the brush.

15. In a cotton harvester a picker moving in an orbit and rotating upon its axis, a rotating brush coöperating with the picker, and a rotating cylinder having means for reciprocating the picker parallel with the axis of the brush.

16. In a cotton harvester a picker moving in an orbit and also moving transversely of the orbital movement, a rotating brush coöperating with the picker and a rotating cylinder having means for reciprocating the picker parallel with the axis of the brush.

17. In a cotton harvester a picker moving in an orbit and also moving transversely of its orbital movement, said picker rotating upon its axis, a rotating brush coöperating with the picker and a rotating cylinder having means for reciprocating the picker parallel with the axis of the brush.

18. In a cotton harvester a picker moving in a sinusoidal orbit, a rotating brush coöperating with the picker, and a rotating cylinder having means for communicating to the picker the reciprocating component of its movement, which component is parallel with the axis of the cylinder.

19. In a cotton harvester a rotating picker moving in a sinusoidal orbit, a rotating brush coöperating with the picker and a rotating cylinder having means for communicating to the picker the reciprocating component of its movement, which component is parallel with the axis of the brush.

20. In a cotton harvester a rotating and revolving picker moving in a sinusoidal orbit, a brush coöperating with the picker, and a rotating cylinder having means for communicating to the picker the reciprocating component of its movement with relation to the brush.

21. In a cotton harvester a picker moving in an orbit and also moving transversely of its orbital movement and rotating upon its axis, a rotating brush coöperating with the picker and a rotating cylinder having means for communicating to the picker the reciprocating component of its movement parallel with the axis of the brush.

22. In a cotton harvester a progressing, rotating and revolving picker moving in a sinusoidal orbit, a brush coöperating with the picker and a rotating cylinder having means for communicating to the picker the reciprocating component of its movement with relation to the brush.

23. In a cotton harvester a progressing, rotating and revolving picker moving in a sinusoidal orbit, a rotating brush coöperating with the picker, and a rotating cylinder having means for communicating to the picker the reciprocating component of its movement with relation to the brush.

24. In a cotton harvester a rotating frame, a series of rotating pickers carried by the frame, a cylinder mounted within the frame and rotating in the opposite direction from that in which the said frame rotates, and means connecting the cylinder with the pickers for reciprocating the same.

25. In a cotton harvester a rotating frame, a series of rotating pickers carried by the frame, a cylinder located within the frame and rotating in the opposite direction from that in which the said frame rotates, and means operatively connecting the cylinder with the pickers for reciprocating the latter.

26. In a cotton harvester, a rotating frame, a series of rotating pickers carried by the frame, a cylinder located within the frame and rotating in the opposite direction from that in which the frame rotates, and means operatively connecting the cylinder with the pickers for reciprocating the same.

27. In a cotton harvester, a rotating frame, a series of rotating pickers carried by the frame, a cylinder located within the frame and rotating in the opposite direction from that in which the said frame rotates, a brush mounted for rotation with the cylinder, and means operatively connecting the cylinder with the pickers for reciprocating the same with relation to the frame and the brush.

28. In a cotton harvester, a rotating frame, a series of rotating disks carried by the frame, shafts journaled in the disks, pickers carried by the shafts, a cylinder located in the frame, means operatively connecting the cylinder with the pickers for reciprocating the same, pulleys mounted upon the shafts of the pickers, a pulley rotating with the cylinder, and an endless belt passing about all of the said pulleys.

29. In a cotton harvester, a rotating frame, a series of rotating pickers carried by the frame, means for reciprocating the pickers, pulleys slidably mounted upon the shafts of the pickers, a pulley located within the frame, and an endless belt passing around the last said pulley and having contact with the opposite sides of the adjacent pulleys carried by the picker shafts.

30. In a cotton harvester, a series of pickers, endless belt conveyers located under the pickers and rotating brushes mounted at the edges of said belt conveyers.

31. In a cotton harvester, a series of pickers, frames hingedly mounted below the pickers and having runners, and endless belt conveyers mounted upon the said frames.

32. In a cotton harvester, a series of pickers, endless belt conveyers located below the pickers, and gratings interposed between the belt conveyers and pickers.

33. In a cotton harvester, a rotating frame, pickers carried by the frame and being journaled for rotation, a cylinder located within the frame and rotating in the opposite direction from that in which the frame rotates, and being provided at its periphery with an annular groove, and blocks journaled upon the pickers and having lugs located in the said grooves.

34. In a cotton harvester, a frame mounted for rotary movement, a series of rotating pickers carried by the frame, a cylinder located within the frame and rotating in the opposite direction from that in which the said frame rotates, blocks journaled upon the pickers and being confined against movement longitudinally thereof, said blocks having sliding contact with said cylinder and adapted to be reciprocated by the same.

35. In a cotton harvester, a rotating frame, rotating pickers carried by the frame, a cylinder journaled for rotation within the frame, and having at its periphery an annular groove, and blocks journaled upon the pickers and being retained against movement longitudinally thereof, and having laterally disposed lugs which enter the grooves of the said cylinder.

36. In a cotton harvester, a rotating frame, a series of rotating disks carried by the frame, pickers carried by the disks, a cylinder located within the frame and journaled for rotation in the opposite direction from that in which the frame rotates, blocks carried by the pickers and having sliding contact with the cylinder, and adapted to be reciprocated as the same rotates, and a brush mounted for rotation with the cylinder and having contact with the series of pickers.

In testimony that I claim the foregoing as my own, I have hereto affixed my signature in the presence of two witnesses.

BILLIE JOHNSON.

Witnesses:
J. C. Dollor,
L. C. Strange.